(12) United States Patent
Stein

(10) Patent No.: US 9,504,014 B2
(45) Date of Patent: Nov. 22, 2016

(54) METHODS AND APPARATUSES FOR P-CCPCH-AIDED CHANNEL ESTIMATION IN WIRELESS SYSTEMS

(71) Applicant: QUALCOMM Incorporated, San Diego, CA (US)

(72) Inventor: Jeremy M. Stein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/692,871

(22) Filed: Dec. 3, 2012

(65) Prior Publication Data

US 2013/0265926 A1     Oct. 10, 2013

Related U.S. Application Data

(60) Provisional application No. 61/621,671, filed on Apr. 9, 2012.

(51) Int. Cl.
| | |
|---|---|
| *H04W 72/00* | (2009.01) |
| *H04L 25/02* | (2006.01) |
| *H04B 1/707* | (2011.01) |

(52) U.S. Cl.
CPC ........ *H04W 72/005* (2013.01); *H04L 25/0236* (2013.01); *H04B 2001/70724* (2013.01)

(58) Field of Classification Search
CPC .................................................. H04W 72/005
See application file for complete search history.

(56) References Cited

U.S. PATENT DOCUMENTS

| | | | |
|---|---|---|---|
| 6,839,565 B2* | 1/2005 | Sarkkinen et al. | 455/503 |
| 7,711,034 B2 | 5/2010 | Dabak et al. | |
| 7,848,391 B2 | 12/2010 | Shnaider et al. | |
| 8,493,942 B2 | 7/2013 | Luo et al. | |
| 2004/0153679 A1* | 8/2004 | Fitton et al. | 713/322 |
| 2007/0177732 A1* | 8/2007 | Schotten et al. | 380/215 |
| 2008/0043680 A1* | 2/2008 | Fitton | 370/335 |
| 2008/0207228 A1* | 8/2008 | Catovic et al. | 455/458 |
| 2009/0028222 A1* | 1/2009 | Shnaider | H04B 1/7103 375/148 |

(Continued)

FOREIGN PATENT DOCUMENTS

WO     2007016553 A1     2/2007

OTHER PUBLICATIONS

International Search Report and Written Opinion—PCT/US2013/035833—ISA/EPO—Jul. 22, 2013.

(Continued)

*Primary Examiner* — Brandon Renner
(74) *Attorney, Agent, or Firm* — Darren M. Simon

(57) ABSTRACT

The present disclosure provides methods and apparatuses for performing channel estimation in a wireless environment using a Primary Physical Common Control Channel (P-CCPCH) to aid in channel estimation. For example, according to an example method provided by the present disclosure, a user equipment (UE) may receive a pilot signal and a Primary Physical Common Control Channel (P-CCPCH) signal from a network entity. In an aspect, the P-CCPCH signal may include initial broadcast channel (BCH) data layered thereon. Furthermore, the UE may predict estimated P-CCPCH data based on the initial BCH data. Additionally, in an aspect, the UE may estimate a channel based on at least the estimated P-CCPCH data and the pilot signal. As such, more reliable channel estimation is possible in wireless systems, such as at UE locations at the geographical periphery of a network entity serving area.

22 Claims, 10 Drawing Sheets

(56) References Cited

U.S. PATENT DOCUMENTS

| | | | |
|---|---|---|---|
| 2010/0216497 A1* | 8/2010 | Kawasaki | H04W 72/1231 455/501 |
| 2011/0158293 A1 | 6/2011 | Shiu et al. | |
| 2011/0205984 A1* | 8/2011 | Lee | H04B 1/0053 370/329 |
| 2012/0044981 A1* | 2/2012 | Nissila | H04B 1/7107 375/224 |
| 2012/0238268 A1 | 9/2012 | Radulescu et al. | |
| 2013/0150104 A1* | 6/2013 | Clevorn | H04L 25/0228 455/501 |

OTHER PUBLICATIONS

Montalbano G., et al., "Joint common-dedicated pilots based estimation of time-varying channels for W-CDMA receivers", Vehicular Technology Conference, 2003. VTC 2003—Fall, 2003 IEEE 58th Orlando, FL, USA Oct. 6-9, 2003; [IEEE Vehicular Technolgy Conference], Piscataway, NJ, USAJEEE, US, Oct. 6, 2003 (Oct. 6, 2003), pp. 1253-1257, vol. 2, XP010700835, DOI: 10.1109/VETECF.2003.1285223, ISBN: 978-0-7803-7954-1.

* cited by examiner

METHODS AND APPARATUSES FOR P-CCPCH-AIDED CHANNEL ESTIMATION IN WIRELESS SYSTEMS

CLAIM OF PRIORITY UNDER 35 U.S.C. §119

The present Application for Patent claims priority to Provisional Application No. 61/621,671 filed Apr. 9, 2012, assigned to the assignee hereof, and hereby expressly incorporated by reference herein.

BACKGROUND

Field

Aspects of the present disclosure relate generally to wireless communication systems, and more particularly, to wireless channel estimation.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

To ensure reception of wireless signals in a wireless environment, a wireless device may estimate a channel associated with a network entity, such as a base station. By estimating the channel, the wireless device may determine transmission characteristics of the transmitting base station, such as its timing schedule, signal phase, and other basic, necessary information. Typically, mobile devices estimate such channels by detecting, measuring, and processing a pilot signal transmitted by the network entity. In most wireless networks, this pilot signal is transmitted via a common pilot indicator channel (CPICH), which often serves as the exclusive basis for channel estimation and/or computing a related channel impulse response in legacy wireless communication systems and devices. In addition, these network entities often transmit a Primary Physical Common Control Channel (P-CCPCH), which is broadcast with a constant channelization code, slot format, and transmission time interval. The P-CCPCH contains important network parameter information that a mobile device may analyze before creating a dedicated connection with the network entity.

In some instances, the signal power of the CPICH is not strong enough when received by its set of client user equipment (UE) to allow each UE to perform reliable channel estimation based exclusively on the CPICH. Regardless of how weak the CPICH power may be in legacy systems, however, UEs of these systems continue to rely exclusively on the CPICH for channel estimation in spite of receiving a robust and predictable P-CCPCH.

Thus, because a weak received CPICH may not be powerful enough alone for some mobile devices to reliably estimate a channel, an improved method and apparatus for estimating a channel aided by the P-CCPCH is needed.

SUMMARY

Figure 1A:
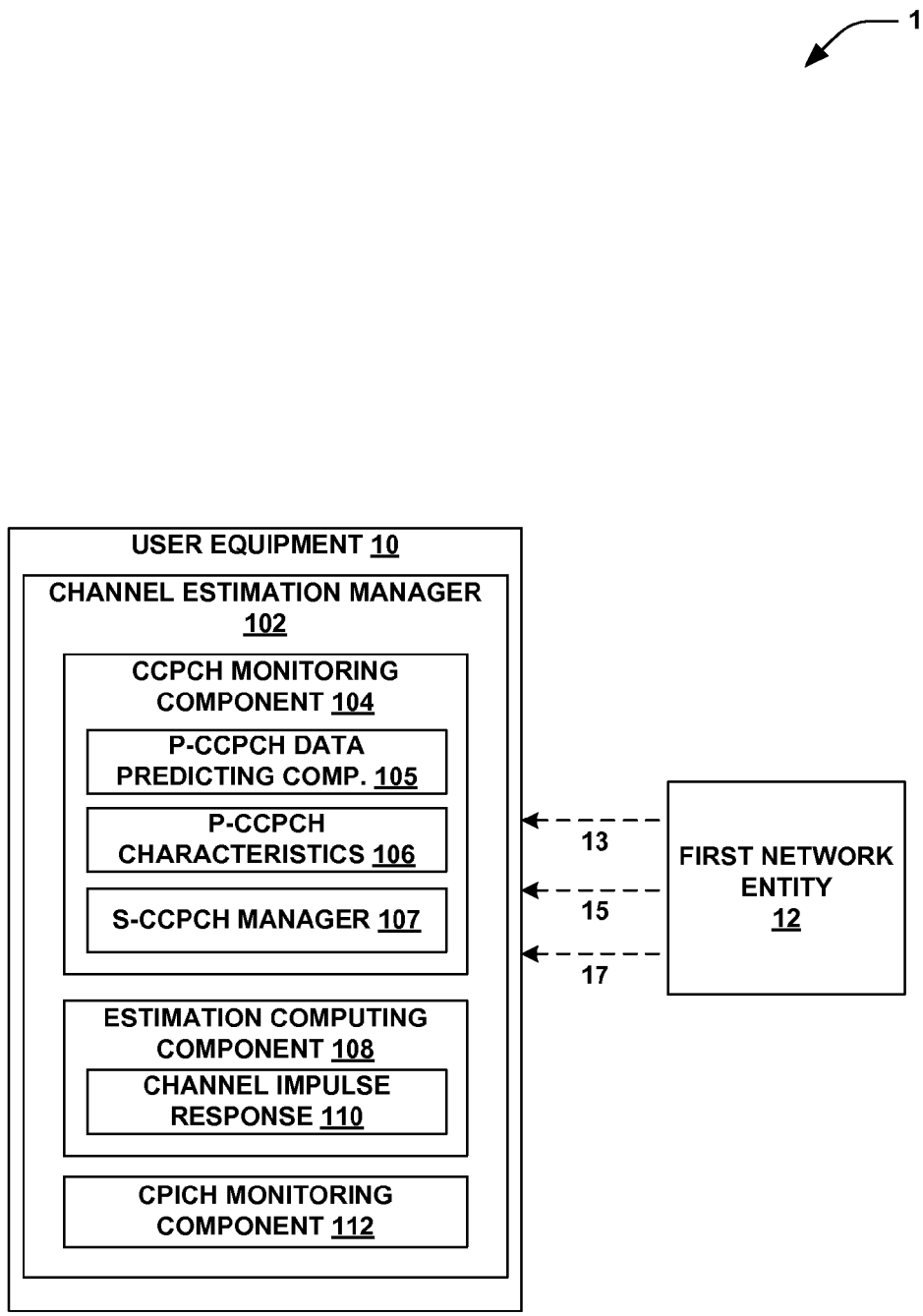
FIG. 1A is a block diagram illustrating an example wireless system of aspects of the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents methods and apparatuses for improving channel estimation in wireless communication environments by utilizing signals transmitted on the P-CCPCH to aid received pilot signals in channel estimation. In one aspect, the present disclosure presents a method of channel estimation in a wireless environment, which includes receiving, at a user equipment, a pilot signal and a P-CCPCH signal from a network entity. In a non-limiting aspect, the P-CCPCH signal may contain initial Broadcast Channel (BCH) data. Additionally, the example method may further include predicting estimated P-CCPCH data based on the initial BCH data. Furthermore, in an aspect of the method, the UE may estimate a channel based on at least the estimated P-CCPCH data and the pilot signal.

In an additional aspect, the present disclosure describes an example apparatus configured to perform channel estimation in a wireless environment. The example apparatus may also contain means for receiving a pilot signal and a P-CCPCH signal from a network entity, and again the P-CCPCH signal may include initial BCH data. In addition, the example apparatus may include means for predicting estimated P-CCPCH data based on the initial BCH data and means for estimating a channel based on at least the estimated P-CCPCH data and the pilot signal.

Moreover, the present disclosure presents an apparatus configured to perform channel estimation in a wireless environment, which may include at least one processor and a memory coupled to the at least one processor. In an aspect, the at least one processor may be configured to receive a pilot signal and a P-CCPCH signal from a network entity, where the P-CCPCH signal may include initial BCH data. Furthermore, the apparatus may predict estimated P-CCPCH data based on the initial BCH data and may estimate a channel based on at least the estimated P-CCPCH data and the pilot signal.

Additionally, the present disclosure describes a computer-readable medium that may store executable code for receiving, at a UE, a pilot signal and a P-CCPCH signal from a network entity, where the P-CCPCH signal may include initial BCH data. Furthermore, the medium may store executable code for predicting estimated P-CCPCH data based on the initial BCH data and for estimating a channel based on at least the estimated P-CCPCH data and the pilot signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides methods and apparatuses for supporting improved channel estimation by utilizing the P-CCPCH as the basis for channel estimation at a mobile device or user equipment (UE). For example, rather than exclusively utilizing the CPICH for channel estimation and/or computing a channel impulse response (CIR) associated with the channel as in legacy networks, the UE may receive, demodulate, and process a received P-CCPCH signal to aid in estimating the channel. For example, in an aspect, the UE may receive initial P-CCPCH data, which may comprise broadcast control channel (BCH) data, and may use the initial P-CCPCH data to predict estimated P-CCPCH data to be received subsequently by the UE.

Referring to FIG. 1A, a wireless communication system 1 is illustrated that improved channel estimation using a P-CCPCH. System 1 includes a UE 10 that receives one or more signals, such as those on a P-CCPCH 13, an S-CCPCH 15, and a CPICH 17, from a network entity 12. The P-CCPCH 13 is a physical channel that carries Broadcast Channel (BCH) information, which may include system information block (SIB) data. The S-CCPCH 15 is a downlink transport channel to which a paging channel (PCH) is mapped, and may carry PCH data. The CPICH 17 is a broadcast channel associated with each wireless cell serviced by a network entity 12 that may broadcast a pilot signal at a known power and bit sequence that may aid in cell power and phase measurements and channel estimation. Network entity 12 may include one or more of any type of network component, such as an access point, including a base station (BS) or node B, a relay, a peer-to-peer device, an authentication, authorization and accounting (AAA) server, a mobile switching center (MSC), etc., that can enable UE 10 to communicate and/or that can establish and maintain one or more data flows.

Furthermore, the P-CCPCH may be transmitted for 90% of a communication slot, where the other 10% may be utilized by the Synchronization Channel (SCH). The SCH may consist of the Primary SCH and the Secondary SCH, and the total power of the SCH is often, but not always, equal to that of the P-CCPCH. Thus, for the 10% of a slot where the P-CCPCH is not transmitted, the SCH can be used to aid in estimating a CIR of the P-CCPCH. However, in some examples, as the P-CCPCH is data-modulated, signals received over the P-CCPCH must first be demodulated before they can be used to aid the CIR estimation.

In addition, each BCH system information message may carry System Information Block (SIB) information. Furthermore, one such message may carry several SIBs or part of a SIB, depending on the size. In addition, the SIB message(s) may fit into the size of a BCH transport block and may be grouped together where a BCH system information message contains more than one SIB. In some examples, the SIBs may be organized according to a Master Information Block (MIB) carried by the P-CCPCH. This MIB may also be referred to as "SIB 0." To facilitate communication synchronization, the MIB may be sent regularly and its scheduling may be static. The MIB contains information related to the SIBs, which may include information related to SIB scheduling. For example, the MIB may include information referencing one or more scheduling blocks, which may themselves reference the SIBs and their scheduling.

Furthermore, though BCH message data is typically periodic and relatively static in value over time, the MIB may contain SIB-specific timers associated with changing data that the UE may utilize to trigger re-reading of blocks containing frequently changing parameters. Additionally or alternatively, for some SIBs with more static parameters, the MIB may contain a "value tag" that may indicate a change of information in relation to a previously received MIB or associated SIB. Thus, by monitoring the value tag, the UE can be configured to decipher whether any of the SIBs have changed. In some examples, a network (through, for example, network entity 12) can also inform the UE of the change of system information by transmitting one or more paging messages to the UE via the PCH transport channel, or with a System Information Change Indication message on the FACH transport channel, which may be S-CCPCH 15.

In a further aspect, UE 10 may include a channel estimation manager 102, which may be configured to estimate a channel associated with network entity 12. In an aspect, channel estimation manager 102 may include a CCPCH monitoring component 104, which may be configured to receive one or more signals associated with a P-CCPCH transmitted by network entity 12. In addition, CCPCH monitoring component 104 may include a P-CCPCH data predicting component 105, which may be configured to predict P-CCPCH data based on initial P-CCPCH data received at the start of a communication session or a frame therein. In an aspect, the initial P-CCPCH data may include one or more initial BCH message(s). Because the BCH message data seldom changes over time, in some examples, P-CCPCH data predicting component 105 may predict subsequent P-CCPCH data and/or BCH data by concluding that such subsequent data will be identical to the last BCH data received which may be the initial P-CCPCH data and/or the initial BCH message(s).

In an additional aspect, CCPCH monitoring component 104 may include an S-CCPCH manager 107, which may be configured to receive one or more paging messages or one or more System Information Change Indication messages (e.g. via the FACH transport channel) from the network. In an aspect, the one or more paging messages or one or more System Information Change Indication messages may be received via a PCH transport channel, which, in some examples, may be a S-CCPCH 15. In an aspect, these one or more paging messages or System Information Change Indication messages may indicate that one or more bits (or fields) in an identified subsequent P-CCPCH frame have changed from the last-received or initial value. Based on this change indication from the network, the P-CCPCH data predicting component 105 may ignore the changing bits predict a specific value for the forthcoming changed bit in the indicated frame, for example, based on a acceptable level of confidence that the predicted specific value will be accurate. This level of confidence may be based on historical analysis of the behavior of the indicated changing frame. In an additional aspect, P-CCPCH data predicting component 105 may be configured to generate a prediction confidence level associated with one or more P-CCPCH bits. Using this prediction confidence level, channel estimation manager 102, estimation computing component 108, and/or a processing component therein may determine that the suspect data should not be used to aid in channel estimation and may therefore revert to the legacy method of solely using the pilot signal for estimation in that frame or subframe. Furthermore, CCPCH monitoring component 104 may monitor or store one or more P-CCPCH characteristics 106, such as, but not limited to, P-CCPCH timing, power, cycle, and/or frequency.

In addition, UE 10 may include an estimation computing component 108, which may be configured to perform channel estimation, which may include computing a channel impulse response (CIR) 110 associated with the channel. In an aspect, the estimation computing component 108 may estimate a channel according to one or more estimation algorithms. In examples presented by the present disclosure, these estimation algorithms may utilize one or both of the P-CCPCH 13 and the CPICH 17 to compute the CIR 110. In some examples, one such example algorithm may be expressed mathematically as:

if(mod(bpg_index, 10) == 0)

$$\hat{h}(n) = \sum_{l=0}^{255} r(l+n) b_0^* (l) s^*(l) w_{0,256}(l) \quad n = 0, 0.5, 1, \ldots, 31.5$$

else $$\hat{h}(n) = c_0 \sum_{l=0}^{255} r(l+n) b_0^* (l) s^*(l) w_{0,256}(l) + c_1 \sum_{l=0}^{255} r(l+n) b_1^* (l) s^*(l) w_{1,256}(l)$$

$$n = 0, 0.5, 1, \ldots, 31.5$$

where the bpg_index is the index of the basic processing group (BPG) starting from the beginning of a frame, $\hat{h}(n)$ is the $n^{th}$ CIR estimate, $r(x)$ denotes the samples in a sample server, $b_0 = (1+j)$ is the constant data on the CPICH 17, $b_1 \in (\pm 1 \pm j)$ is the P-CCPCH demodulation bit set value used for demodulation, $s(x)$ is the complex spreading sequence, and $w_{0,256}(x)$ and $w_{1,256}(x)$ are the 256 orthogonal variable spreading factor (OVSF) codes corresponding to the pilot (e.g., CPICH 17) and the P-CCPCH 13, respectively.

Furthermore, $c_0$ and $c_1$ represent the Maximal Ratio Combining (MRC) and/or scaling constants for use in the example estimation algorithm. In an aspect, the scaling constants may include two scaled estimates of the channel, as follows:

$$\hat{h}_0 = \sqrt{E_{c,0}} * h + n_0$$

$$\hat{h}_1 = \sqrt{E_{c,1}} * h + n_1$$

where the index 0, 1 specifies the CPICH and P-CCPCH estimate respectively, h represents the channel estimate, $E_{c,0}$ and $E_{c,0}$ are the chip power of the pilot (e.g. CPICH 17) and P-CCPCH 13 respectively, and $n_0$ and $n_1$ are the independent Gaussian noise components with zero mean identical variance N. Furthermore, in an aspect, in order to keep the channel estimate scaled according to the power of the CPICH 17, the second estimate may be scaled according to the following relationship:

$$\tilde{h}_1 = \frac{\sqrt{E_{c,0}}}{\sqrt{E_{c,1}}} * \hat{h}_1 = h + \tilde{n}_1$$

where the noise component has a variance of $$N \times \left( \frac{E_{c,0}}{E_{c,1}} \right).$$

The weighting of the MRC combining is according to the SNR. Thus, the channel estimation may be represented as:

$$\hat{h} = \frac{SNR_0}{SNR_0 + SNR_1} \hat{h}_0 + \frac{SNR_1}{SNR_0 + SNR_1} \tilde{h}_1 =$$

$$= \frac{\frac{1}{N}}{\frac{1}{N} + \frac{E_{c,1}}{N * E_{c,0}}} \hat{h}_0 + \frac{\frac{E_{c,1}}{N * E_{c,0}}}{\frac{1}{N} + \frac{E_{c,1}}{N * E_{c,0}}} \tilde{h}_1$$

-continued $$= \frac{E_{c,0}}{E_{c,0} + E_{c,1}} \hat{h}_0 + \frac{E_{c,1}}{E_{c,0} + E_{c,1}} * \frac{\sqrt{E_{c,0}}}{\sqrt{E_{c,1}}} * \hat{h}_1$$

$$= \frac{E_{c,0}}{E_{c,0} + E_{c,1}} \hat{h}_0 + \frac{\sqrt{E_{c,1}} \sqrt{E_{c,0}}}{E_{c,0} + E_{c,1}} * \hat{h}_1 \square c_0 \hat{h}_0 + c_1 * \hat{h}_1$$

It follows that, in the example algorithm, the MRC and/or scaling constants may be represented as:

$$c_0 = \frac{E_{c,0}}{E_{c,0} + E_{c,1}}$$

$$c_1 = \frac{\sqrt{E_{c,1}} \sqrt{E_{c,0}}}{E_{c,0} + E_{c,1}}$$

Figure 1B:
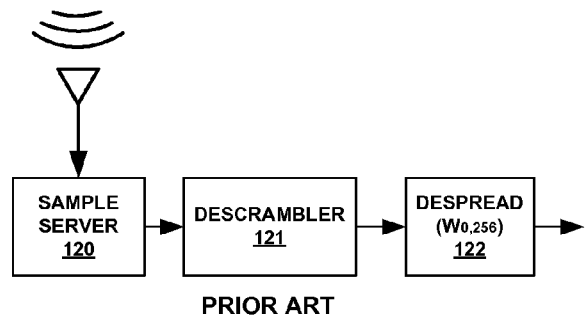
FIG. 1B is a block diagram of an example estimation computing component of the present disclosure.

In a detailed aspect, the estimation computing component 108 may include one or more components that may receive pilot and P-CCPCH signals, such as those components illustrated in FIG. 1B. For example, in an example estimation computing component 108, a sample server 120 may sample and/or store received signals, such as a pilot signal, P-CCPCH signal (including BCH data), or any other received signal. This sampled data may then be output by the sample server 120 to a descrambler 121, which may be configured to descramble received data. In other words, the descrambler 121 may identify a scrambling code associated with received data and may thus decipher the cell, sector, and/or network entity from which the data originated. This cell, sector, and/or network entity identification function of descrambler 121 allows the UE 10 to differentiate data channels and therefore ensures that the proper data is used to estimate the correct channel.

Furthermore, an example estimation computing component 108 may include a despreader 122, which may be configured to despread and accumulate received data into symbols given a particular Orthogonal Variable Spreading Factor (OVSF) associated with the received data. For example, in reference to one non-limiting communications technology, CDMA systems utilize orthogonal signal coding, whereby UEs in the system are distinguished from one another by assigned codes. The codes prevent signal interference between different UEs in the system and are selected such that the codes are orthogonal and thus do not interfere with one another. In legacy CDMA systems, a signal is spread with a code having a defined OVSF before it is transmitted by a transmitting entity, which may be a network entity or a UE. At the receiving entity, the same code is utilized by a despreader (e.g. despreader 122 of FIG. 2) at a receiving entity to despread the signal and assemble the despread chips into symbols.

Figure 2:
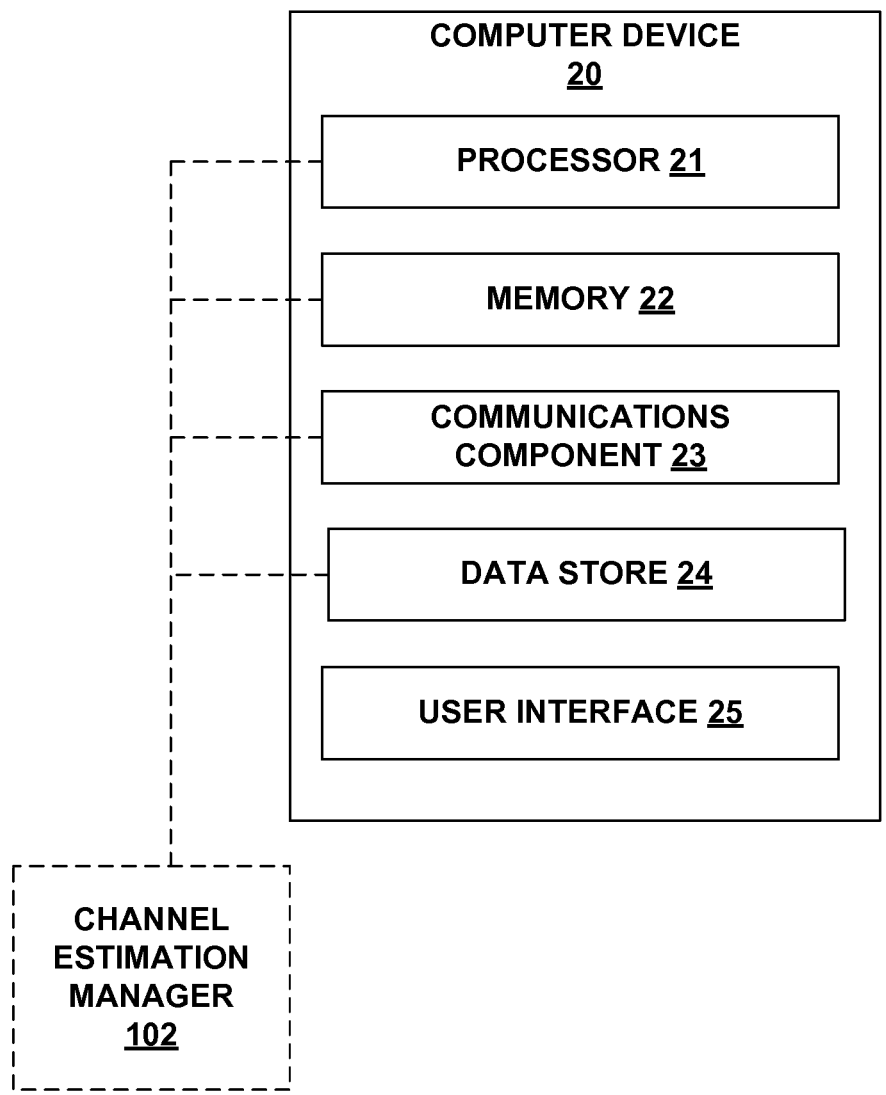
FIG. 2 is a block diagram illustrating an example of a computer device in aspects of the present disclosure

One common group of spreading codes often utilized in CDMA systems is called Walsh Codes. For example, CDMA2000 uses 256 unique Walsh Codes to differentiate channels, though various numbers of Walsh Codes have been used in other systems. In addition, Code 0 in CDMA2000 is reserved for the pilot signal transmitted by a network entity and has a length of 256 bits. Thus, though the present disclosure is not limited to CDMA systems, such as CDMA2000, IS-95, or the like, for purposes of the present disclosure, the term $W_{0,256}$ may represent the spreading code for any pilot signal of any wireless communication technology of any bit length. Thus, despreader 122 of FIG. 2 represents a component (or portion thereof) configured to despread the pilot signal bits, which may be assembled into symbols that may be output by despreader 122 of FIG. 2 and used for channel estimation.

Figure 1C:
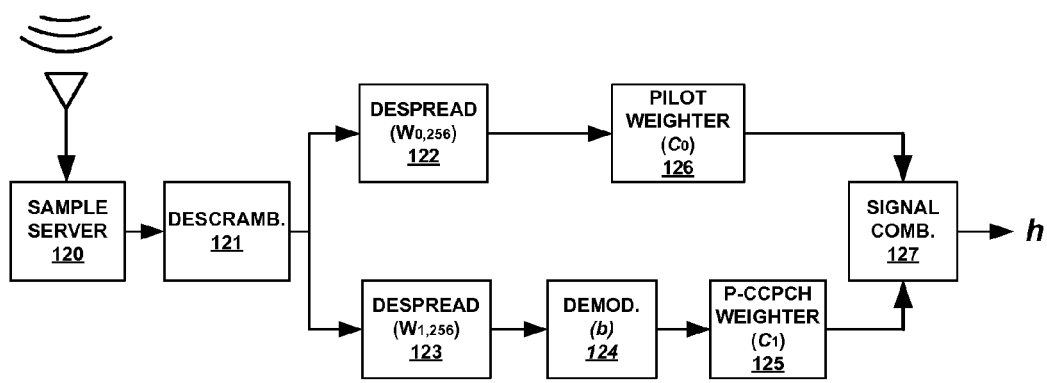
FIG. 1C is a block diagram of an example estimation computing component of the present disclosure.

In addition, FIG. 1C illustrates an example estimation computing component arrangement contemplated by the present disclosure, where the UE may utilize the P-CCPCH to aid in estimating a channel. In an example, the components of FIG. 1C may be configured to cooperatively execute the P-CCPCH-aided channel estimation algorithm introduced above in reference to estimation computing component 108, including weighting the predicted pilot and P-CCPCH data (using MCR/scaling constants $c_0$ and $c_1$) based on the relative strengths of their respective carrier signals and/or their corresponding channels. For example, sample server 120 and descrambler 121 may be configured to perform the same or similar functions their corresponding components in FIG. 1B. In an aspect, unlike in FIG. 1B, the output of descrambler 121 may be output to multiple dispreading components—despreaders 126 and 128. In an aspect, despreader 122 of FIG. 1C may be configured to despread the pilot signal, much like despreader 122 of FIG. 1B. In a further aspect, despreader 123 may be configured to descramble and assemble symbols transmitted on the P-CCPCH (e.g. BCH information) utilizing a Walsh spreading code $W_{1,256}$, which is reserved for the data transmitted via the P-CCPCH in CDMA systems. Furthermore, although $W_{1,256}$ is used in some examples to represent the Walsh Code for a P-CCPCH, it may also represent, for purposes of the present disclosure, any spreading code for any non-pilot signal channel in systems using any wireless communication technology.

In an additional aspect, in some examples, the P-CCPCH data symbols output by despreader 128 may retain their data modulation placed on the data by the transmitting device. Thus, in such examples, it may be necessary to remove this data modulation. Therefore, as an aspect of FIG. 1C, the example estimation computing component may include a demodulator 124, which may be configured to remove such modulation my multiplying the modulated symbols by a bit value b. In some non-limiting examples, the wireless system may employ Phase-Shift Keying (PSK) modulation, such as, but not limited to the Quadrature Phase-Shift Keying (QPSK) modulation scheme employed by WCDMA. In such WCDMA systems, for example, demodulator 124 may multiply the modulated P-CCPCH data by the bit value b, which may have a value from the set $(\pm 1 \pm j)$. Thus, the resulting product can result in the P-CCPCH being shifted from its modulated phase to its pre-modulated phase (e.g. by 45 degrees).

Furthermore, in an aspect, pilot weighting component 126 and/or P-CCPCH weighting component 125 may be configured to compute scaling constants $c_0$ and $c_1$, respectively, and to apply the scaling constants to the despread pilot and despread P-CCPCH to give a desired relative weight to each of the pilot and P-CCPCH components of the eventual channel estimate. In an aspect, these scaling constants may be computed as a function of relative signal strength (e.g., as outlined above in reference to the example algorithm) and may be applied to the predicted despread pilot and the despread P-CCPCH by computing the product of the respective scaling constant and each bit of the respective despread signals.

In addition, the example estimation computing component of FIG. 1C may include a signal combining component 127, which may be configured to generate a channel estimate h by combining (e.g. by summing) the weighted estimated pilot and weighted estimated P-CCPCH signals output by pilot weighting component 126 and P-CCPCH weighting component 125. As such, some channel estimate methods and apparatuses of the present disclosure may be based on both the received pilot signal and aided by previously-received P-CCPCH data, such as initial BCH data.

Thus, according to some examples, the CIR may be computed by predicting the contents of subsequently transmitted P-CCPCH data and setting the value of scaling constants $c_0$ and $c_1$ accordingly. Additionally or alternatively, however, the values of the scaling constants $c_0$ and $c_1$ may be weighted based on the demodulated P-CCPCH data output by demodulator 124 instead of a predicted P-CCPCH value. Furthermore, in some examples, this demodulated data may be used by a UE or a component therein (e.g. channel estimation manager 102 of FIG. 1) to check the correctness of a predicted P-CCPCH value by comparing the demodulated P-CCPCH data with predicted P-CCPCH data. In an aspect, based on a disparity between the data discovered during the comparing, the UE or a component therein may adjust one or both of the scaling constants $c_0$ and $c_1$ to base the CIR estimation more heavily on either of the P-CCPCH or the CPICH. Thus, by this process, the UE or a component therein may determine an estimated P-CCPCH data reliability value (and/or an estimated pilot signal reliability value if performed on received CPICH data) associated with a slot and may weight the scaling constants based on the data reliability value or values.

In yet another an additional or alternative aspect of such prediction-checking to obtain and utilize data reliability values, though a UE may in some instances be notified via the contents of a S-CCPCH message that a particular bit or set of bits in a P-CCPCH message have been or will be altered, this may not always be the case. For example, in some examples, some SIB messages or fields therein may change without such prior notification via the S-CCPCH, which may occur in relation to, for example, the SIB 7 message of the P-CCPCH. In an aspect, the UE or a component therein may perform a comparison between the demodulated P-CCPCH data and the predicted P-CCPCH data to potentially determine whether the P-CCPCH data of such SIB messages or fields have changed unexpectedly or without prior notification from the S-CCPCH. Again, in such instances, the UE or component may weigh the scaling constants $c_0$ and $c_1$ accordingly to mitigate such unforeseen P-CCPCH data alterations.

Referring to FIG. 2, in one aspect, any of UE 10, or the one or more network entities 12 (FIG. 1A) may be represented by a specially programmed or configured computer device 20. Computer device 20 includes a processor 21 for carrying out processing functions associated with one or more of components and functions described herein. Processor 21 can include a single or multiple set of processors or multi-core processors. Moreover, processor 21 can be implemented as an integrated processing system and/or a distributed processing system.

Computer device 20 further includes a memory 22, such as for storing data used herein and/or local versions of applications being executed by processor 21. Memory 22 can include any type of memory usable by a computer, such as random access memory (RAM), read only memory (ROM), tapes, magnetic discs, optical discs, volatile memory, non-volatile memory, and any combination thereof.

Further, computer device 20 includes a communications component 23 that provides for establishing and maintaining communications with one or more parties utilizing hardware, software, and services as described herein. Communications component 23 may carry communications between components on computer device 20, as well as between computer device 20 and external devices, such as devices located across a communications network and/or devices serially or locally connected to computer device 20. For example, communications component 23 may include one or more buses, and may further include transmit chain components and receive chain components associated with a transmitter and receiver, respectively, or a transceiver, operable for interfacing with external devices. In an additional aspect, communications component 23 may be configured to receive one or more pages from one or more subscriber networks. In a further aspect, such a page may correspond to the second subscription and may be received via the first technology type communication services.

Additionally, computer device 20 may further include a data store 24, which can be any suitable combination of hardware and/or software, that provides for mass storage of information, databases, and programs employed in connection with aspects described herein. For example, data store 24 may be a data repository for applications not currently being executed by processor 21.

Computer device 20 may additionally include a user interface component 25 operable to receive inputs from a user of computer device 20, and further operable to generate outputs for presentation to the user. User interface component 25 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 25 may include one or more output devices, including but not limited to a display, a speaker, a haptic feedback mechanism, a printer, any other mechanism capable of presenting an output to a user, or any combination thereof.

In a mobile station implementation, such as for UE 10 of FIG. 1A, computer device 20 may include channel estimation manager 102, such as in specially programmed computer readable instructions or code, firmware, hardware, or some combination thereof.

Figure 3:
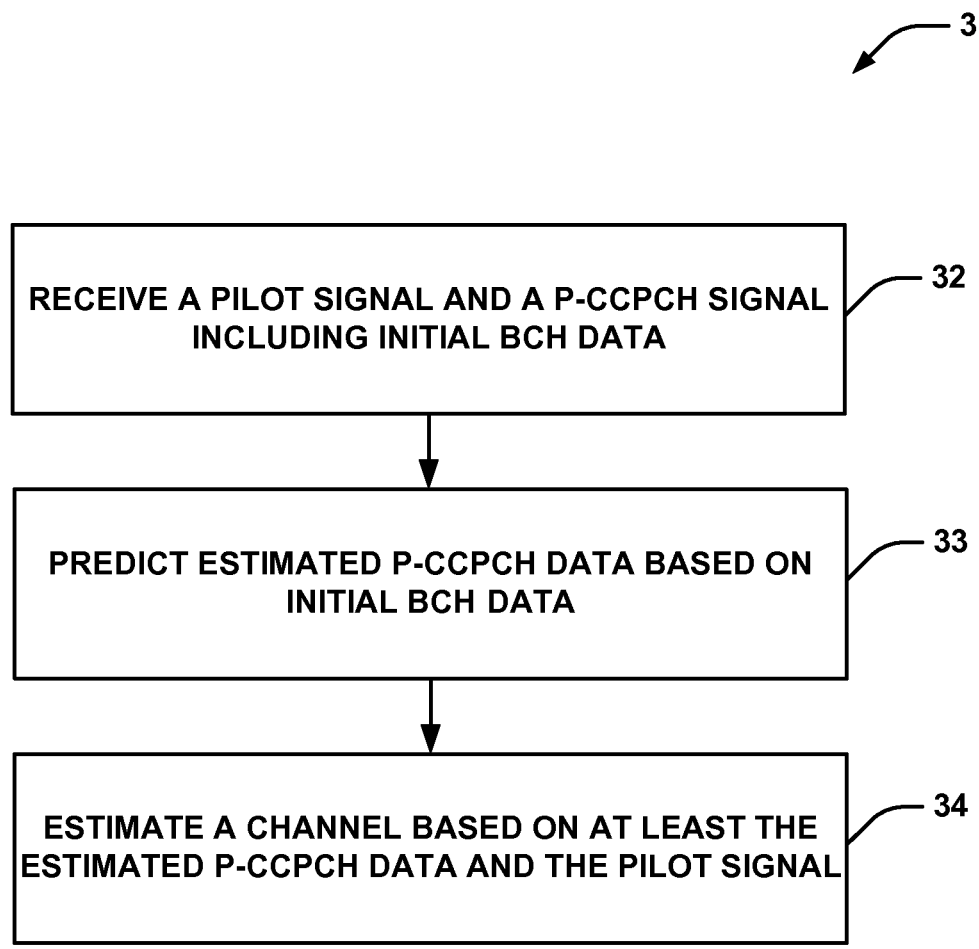
FIG. 3 is a flow diagram illustrating aspects of a method for supporting P-CCPCH-based channel estimation according to aspects of the present disclosure.

Referring to FIG. 3, an example methodology for improved channel estimation aided by a P-CCPCH is illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In an aspect, at block 32, a UE (e.g. UE 10, FIG. 1A) may receive a pilot signal and a P-CCPCH signal from a network entity. In an aspect, this P-CCPCH may include initial BCH data, which may communicate important connection and communication parameters and characteristics of the network entity and/or a node, cell, or sector that the network entity serves. Additionally, a frame of P-CCPCH may include synchronization channel information (SCH) and P-CCPCH data. In an example, the P-CCPCH frame may include approximately ten percent SCH information and ninety percent P-CCPCH data.

In some examples, at block 33, the UE may predict estimated P-CCPCH data based on previously-received BCH data, such as initial BCH data received by the UE. In an aspect, predicting the estimated P-CCPCH data may include setting the estimated P-CCPCH data to the initial BCH data or last-known P-CCPCH data. Additionally, in some examples, predicting estimated P-CCPCH data may further include receiving an indication from the network that one or more bits of future P-CCPCH signal data will change values in a future slot. Such received indications heighten the likelihood that a prediction error may occur at the indicated future slot. Thus, to avoid such a prediction error, the UE may set the value of predicted P-CCPCH data to last known P-CCPCH data for the future slot or may disable estimating the channel during the future slot altogether based on the indication.

Furthermore, at block 34, the UE may estimate a channel based on at least the estimated P-CCPCH data and the pilot signal. In an aspect, the UE may weight one or both of the estimated P-CCPCH data and the pilot signal contents according to respective scaling constants. After this optional weighting process, the UE may combine the weighted estimated P-CCPCH data and the weighted pilot signal to obtain a channel estimate.

Figure 4:
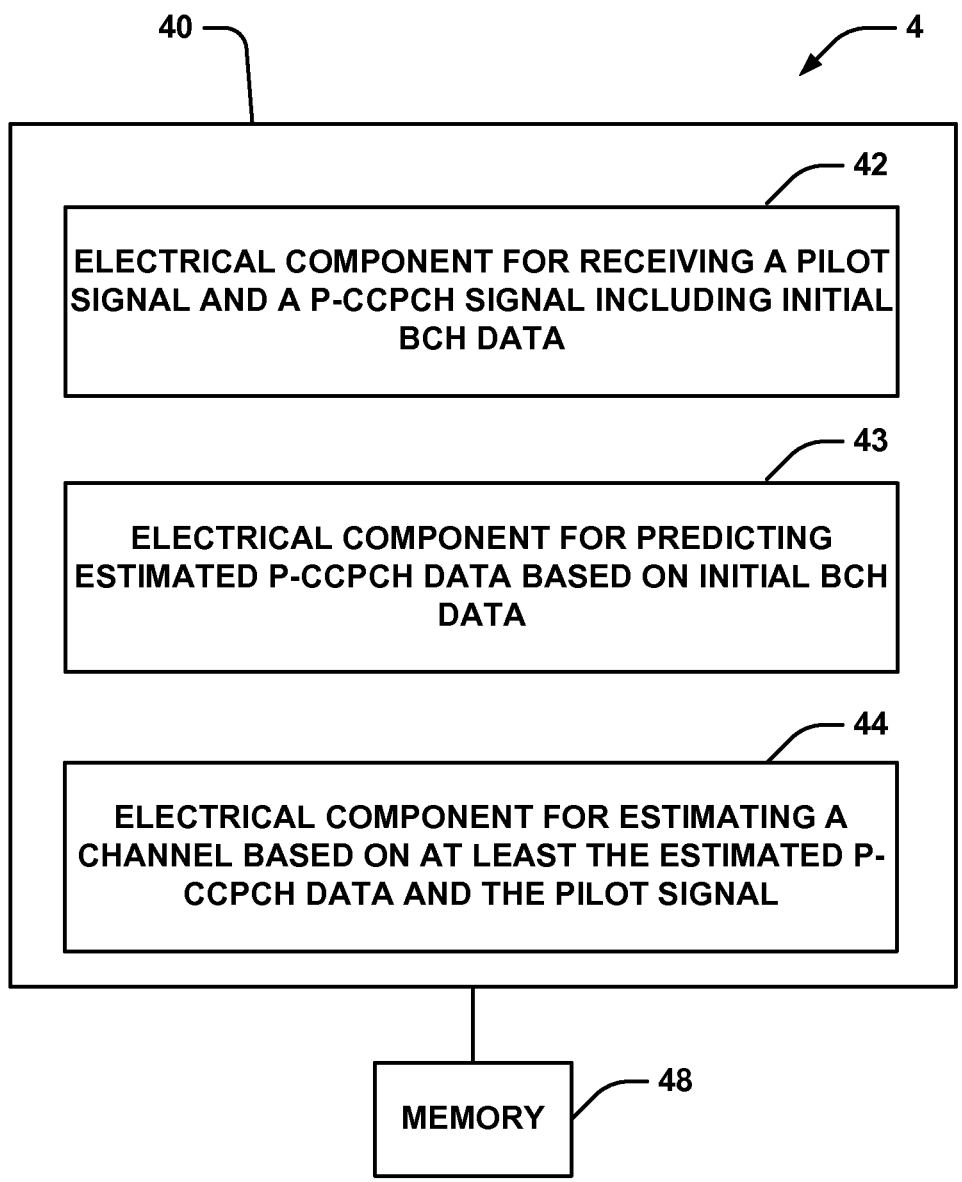
FIG. 4 is a component diagram illustrating aspects of a logical grouping of electrical components as contemplated by the present disclosure.

Referring to FIG. 4, an example system 4 is displayed for improved channel estimation aided by a P-CCPCH. For example, system 4 can reside at least partially within one or more network entities. It is to be appreciated that system 4 is represented as including functional blocks, which can be functional blocks that represent functions implemented by a processor, software, or combination thereof (e.g., firmware). System 4 includes a logical grouping 40 of electrical components that can act in conjunction. For instance, logical grouping 40 can include an electrical component 42 for receiving a pilot signal and a P-CCPCH signal including initial BCH data. In an aspect, electrical component 42 may comprise CCPCH monitoring component 104 (FIG. 1A) and/or communications component 23 (FIG. 2). In an additional optional aspect, logical grouping 40 can include an electrical component 43 for predicting estimated P-CCPCH data based on initial BCH data. In an aspect, electrical component 43 may comprise P-CCPCH data predicting component 105 (FIG. 1A). In an additional aspect, logical grouping 40 can include an electrical component 46 for estimating a channel based on at least the estimated P-CCPCH data and the pilot signal. In an aspect, electrical component 44 may comprise estimation computing component 108 (FIG. 1A).

Additionally, system 4 can include a memory 48 that retains instructions for executing functions associated with the electrical components 42, 43, and 44, stores data used or obtained by the electrical components 42, 43, and 44, etc. While shown as being external to memory 48, it is to be understood that one or more of the electrical components 42, 43, and 44 can exist within memory 48. In one example, electrical components 42, 43, and 44 can comprise at least one processor, or each electrical component 42, 43, and 44 can be a corresponding module of at least one processor. Moreover, in an additional or alternative example, electrical components 42, 43, and 44 can be a computer program product including a computer readable medium, where each electrical component 42, 43, and 44 can be corresponding code.

Figure 5:
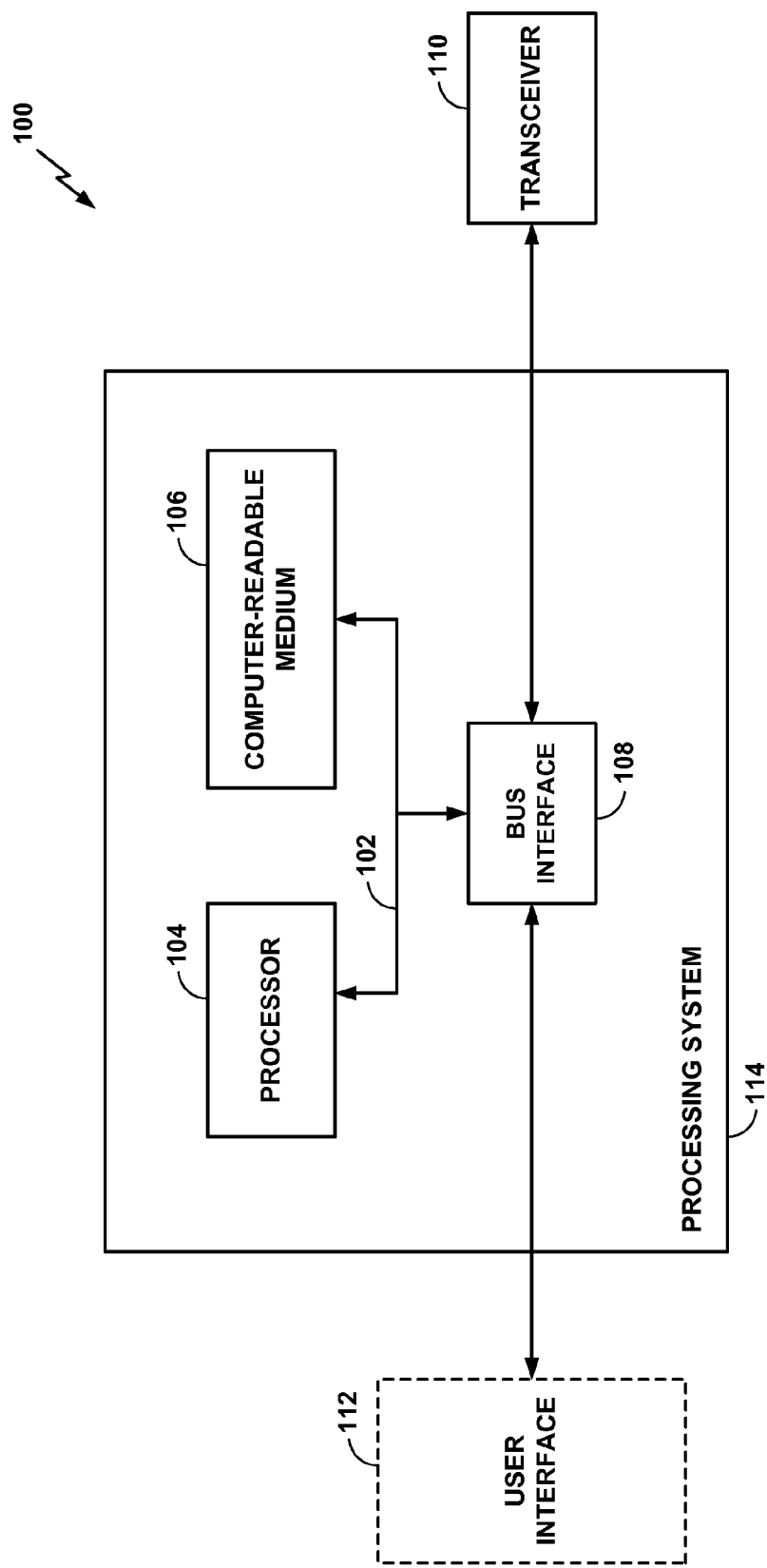
FIG. 5 is a block diagram illustrating an example of a hardware implementation for an apparatus employing a processing system.

FIG. 5 is a block diagram illustrating an example of a hardware implementation for an apparatus 100 employing a processing system 114 for carrying out aspects of the present disclosure, such as methods for improved channel estimation using P-CCPCH data. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 6:
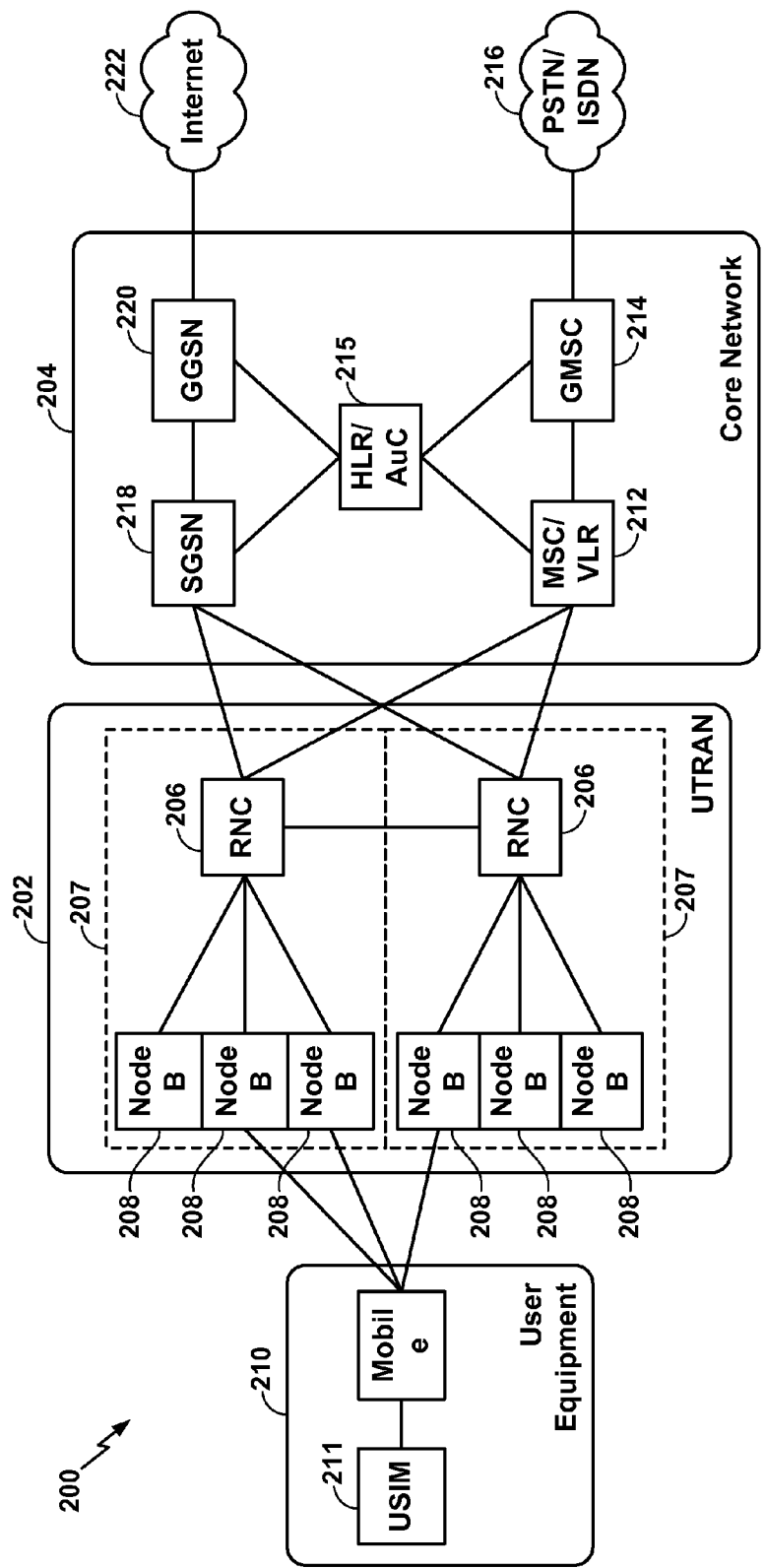
FIG. 6 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In an aspect, UE 210 may be UE 10 (FIG. 1A), and UMTS 202 may comprise network entity 12 (FIG. 1A). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
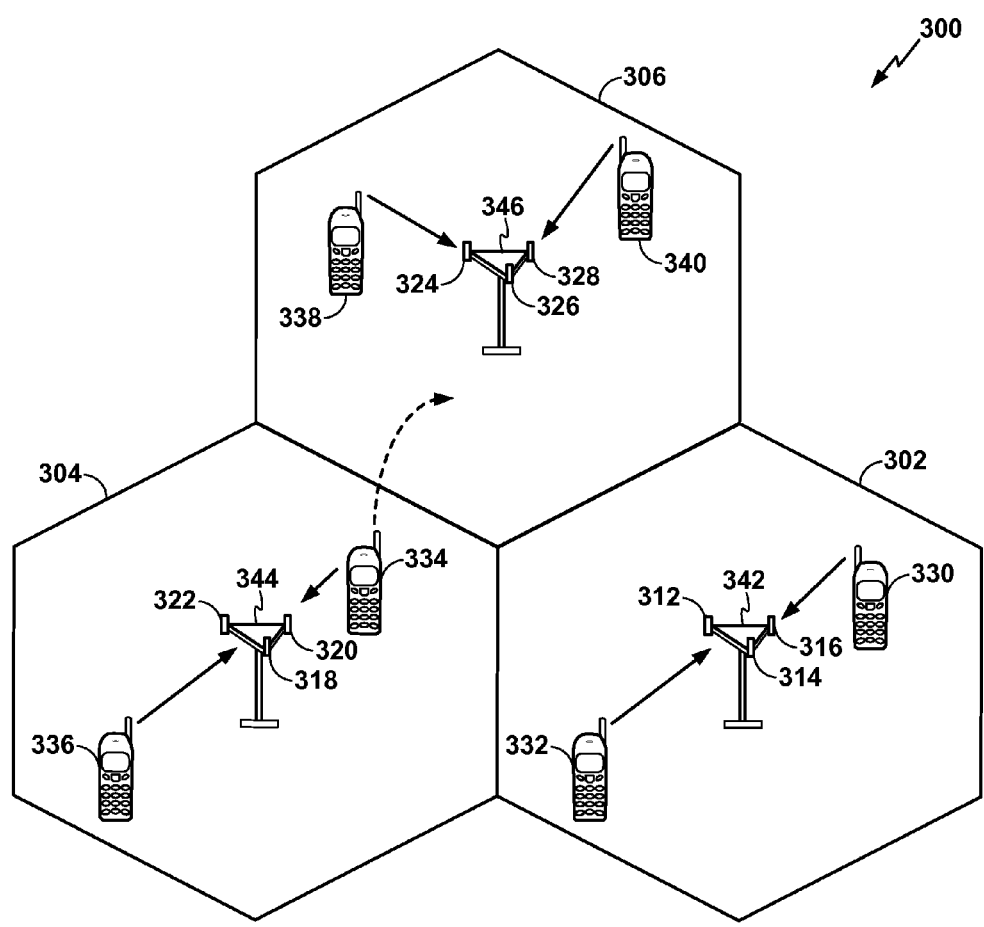
FIG. 7 is a conceptual diagram illustrating an example of an access network.

Referring to FIG. 7, an access network 300 in a UTRAN architecture is illustrated, which may perform improved methods for channel estimation using P-CCPCH data as described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
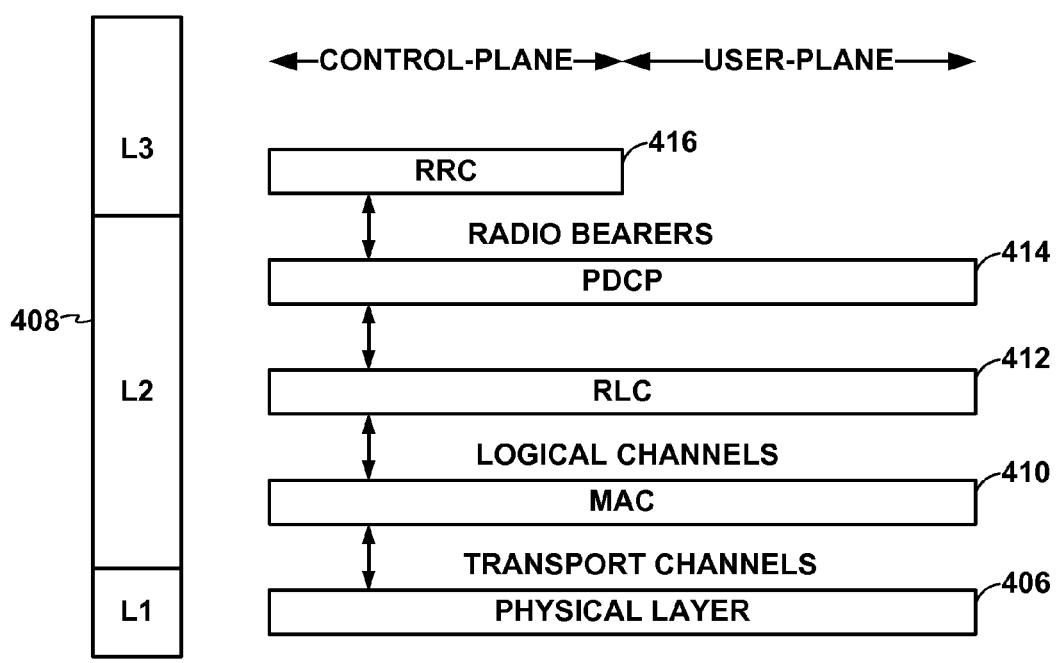
FIG. 8 is a conceptual diagram illustrating an example of a radio protocol architecture for the user and control plane.

The radio protocol architecture may take on various forms depending on the particular application. An example for an HSPA system, which may perform methods for improved channel estimation by utilizing P-CCPCH data, will now be presented with reference to FIG. 8. FIG. 8 is a conceptual diagram illustrating an example of the radio protocol architecture for the user and control planes.

Turning to FIG. 8, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 406. Layer 2 (L2 layer) 408 is above the physical layer 406 and is responsible for the link between the UE and node B over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., fax end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 9:
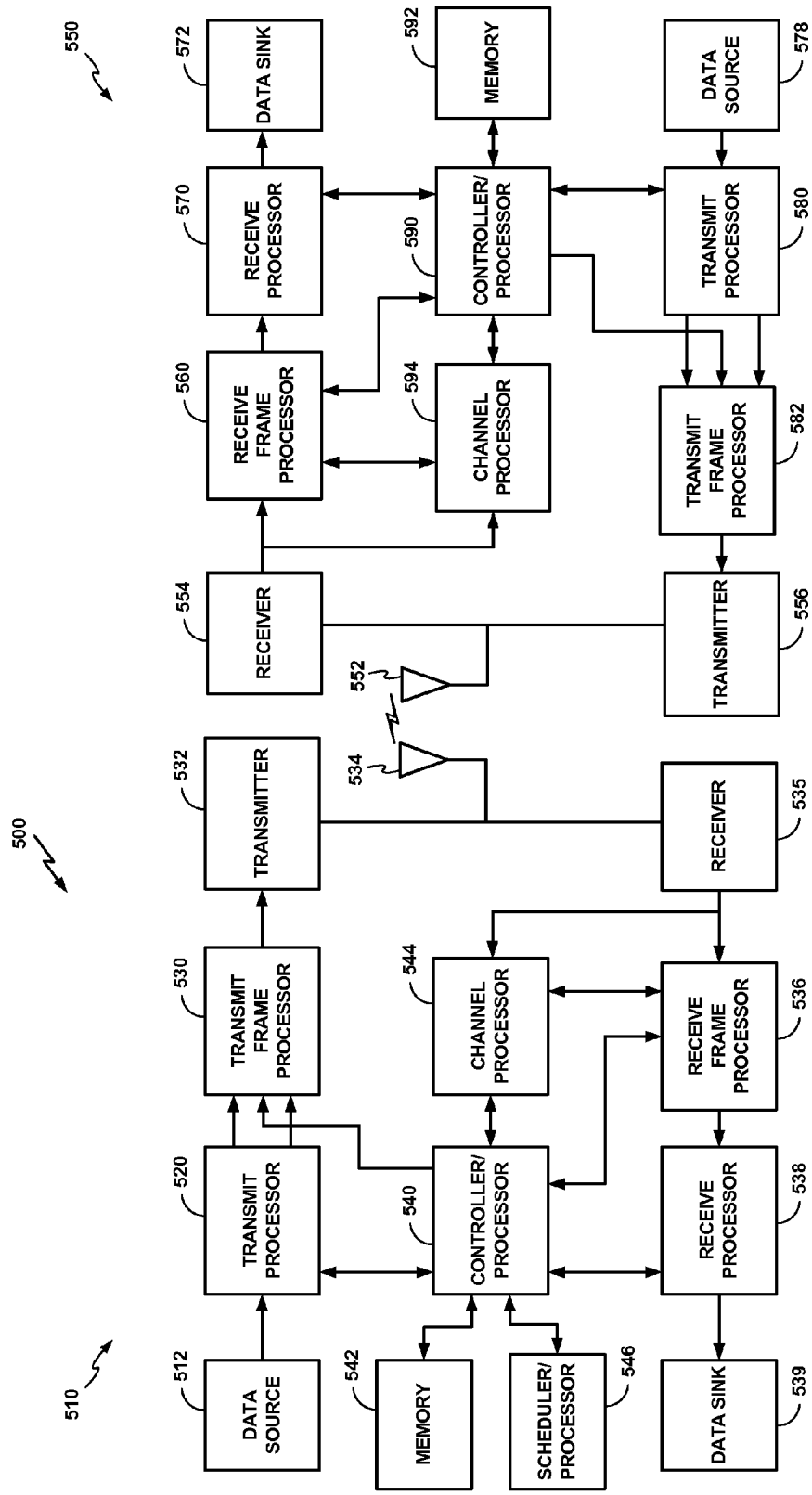
FIG. 9 is a block diagram conceptually illustrating an example of a Node B in communication with a UE in a telecommunications system.

FIG. 9 is a block diagram of a Node B 510 in communication with a UE 550, where the Node B 510 may be the Node B 208 in FIG. 6 or network entity 12 of FIG. 1A, and the UE 550 may be the UE 210 in FIG. 6 or UE 10 of FIG. 1A. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of channel estimation in a wireless environment, comprising:
    receiving, at a user equipment (UE), a pilot signal and an initial Primary Physical Common Control Channel (P-CCPCH) signal from a network entity, wherein the P-CCPCH signal comprises initial broadcast channel (BCH) data;
    predicting, based on at least the initial BCH data, subsequent P-CCPCH data to be received in a subsequent P-CCPCH signal at a time subsequent to the UE receiving the initial P-CCPCH signal;
    computing a first scaling constant based on the pilot signal and a second scaling constant based on the predicted subsequent P-CCPCH data; and
    performing channel estimation of a channel based at least in part on applying the first scaling constant to the pilot signal and the second scaling constant to the subsequent P-CCPCH signal.

2. The method of claim 1, wherein predicting the subsequent P-CCPCH data comprises setting the subsequent P-CCPCH data to the initial BCH data.

3. The method of claim 1, further comprising demodulating the initial BCH data.

4. The method of claim 1, wherein performing the channel estimation comprises estimating a channel impulse response (CIR) of the channel.

5. The method of claim 1, wherein predicting subsequent P-CCPCH data further comprises setting the subsequent P-CCPCH data to last known P-CCPCH data.

6. The method of claim 1, wherein predicting subsequent P-CCPCH data further comprises:
receiving an indication that one or more bits of the subsequent P-CCPCH data will change in a future slot; and
setting the predicted subsequent P-CCPCH data to last known P-CCPCH data for the future slot.

7. The method of claim 1, wherein predicting subsequent P-CCPCH data further comprises:
receiving an indication that one or more bits of the subsequent P-CCPCH data will change in a future slot; and
disabling estimating the channel during the future slot based on the indication.

8. The method of claim 1, further comprising:
determining an estimated P-CCPCH data reliability value associated with the subsequent P-CCPCH data and an estimated pilot signal reliability value associated with a subsequent pilot signal, wherein the subsequent P-CCPCH data and the subsequent pilot signal are associated with a future slot;
weighting one or both of the subsequent P-CCPCH data and the subsequent pilot signal based on one or both of the estimated P-CCPCH data reliability value and the estimated pilot signal reliability value to obtain one or both of a weighted P-CCPCH data estimate and a weighted pilot signal estimate; and
wherein performing the channel estimation further comprises combining the weighted P-CCPCH data estimate and the weighted pilot signal estimate.

9. The method of claim 8, wherein determining the subsequent P-CCPCH data reliability value comprises:
demodulating received P-CCPCH data;
comparing the received P-CCPCH data to the subsequent P-CCPCH data; and
determining the subsequent P-CCPCH data reliability value based on the comparing.

10. The method of claim 9, further comprising determining, based on the comparing, that the received P-CCPCH data differs from the subsequent P-CCPCH data.

11. An apparatus configured to perform channel estimation in a wireless environment, comprising:
at least one processor and a memory coupled to the at least one processor, wherein the at least one processor is configured to:
receive, at a user equipment (UE), a pilot signal and an initial Primary Physical Common Control Channel (P-CCPCH) signal from a network entity, wherein the P-CCPCH signal comprises initial broadcast channel (BCH) data;
predict, based on at least the initial BCH data, subsequent P-CCPCH data to be received in a subsequent P-CCPCH signal at a time subsequent to the UE receiving the initial P-CCPCH signal;
compute a first scaling constant based on the pilot signal and a second scaling constant based on the predicted subsequent P-CCPCH data; and
perform channel estimation of a channel based at least in part on applying the first scaling constant to the pilot signal and the second scaling constant to the subsequent P-CCPCH signal.

12. A non-transitory computer-readable medium storing computer executable code, comprising:
code for receiving, at a user equipment (UE), a pilot signal and an initial Primary Physical Common Control Channel (P-CCPCH) signal from a network entity, wherein the P-CCPCH signal comprises initial broadcast channel (BCH) data;
code for predicting, based on at least the initial BCH data, subsequent P-CCPCH data to be received in a subsequent P-CCPCH signal at a time subsequent to the UE receiving the initial P-CCPCH signal;
code for computing a first scaling constant based on the pilot signal and a second scaling constant based on the predicted subsequent P-CCPCH data; and
code for performing channel estimation of a channel based at least in part on applying the first scaling constant to the pilot signal and the second scaling constant to the subsequent P-CCPCH signal.

13. An apparatus configured to perform channel estimation in a wireless environment, comprising:
means for receiving, at a user equipment (UE), a pilot signal and an initial Primary Physical Common Control Channel (P-CCPCH) signal from a network entity, wherein the P-CCPCH signal comprises initial broadcast channel (BCH) data;
means for predicting, based on at least the initial BCH data, subsequent P-CCPCH data to be received in a subsequent P-CCPCH signal at a time subsequent to the UE receiving the initial P-CCPCH signal;
means for computing a first scaling constant based on the pilot signal and a second scaling constant based on the predicted subsequent P-CCPCH data; and
means for performing channel estimation of a channel based at least in part on applying the first scaling constant to the pilot signal and the second scaling constant to the subsequent P-CCPCH signal.

14. The apparatus of claim 13, wherein the means for predicting the subsequent P-CCPCH data comprises means for setting the subsequent P-CCPCH data to the initial BCH data.

15. The apparatus of claim 13, further comprising means for demodulating the initial BCH data.

16. The apparatus of claim 13, wherein the means for performing channel estimation comprises means for estimating a channel impulse response (CIR) of the channel.

17. The apparatus of claim 13, wherein the means for predicting subsequent P-CCPCH data further comprises means for setting the subsequent P-CCPCH data to last known P-CCPCH data.

18. The apparatus of claim 13, wherein the means for predicting subsequent P-CCPCH data further comprises:
means for receiving an indication that one or more bits of the subsequent P-CCPCH signal data will change in a future slot; and
means for setting the predicted subsequent P-CCPCH data to last known P-CCPCH data for the future slot.

19. The apparatus of claim 13, wherein the means for predicting subsequent P-CCPCH data further comprises:
means for receiving an indication that one or more bits of the subsequent P-CCPCH signal data will change in a future slot; and
means for disabling estimating the channel during the future slot based on the indication.

20. The apparatus of claim 13, further comprising:
means for determining an estimated P-CCPCH data reliability value associated with the subsequent P-CCPCH data and an estimated pilot signal reliability value associated with a subsequent pilot signal, wherein the subsequent P-CCPCH data and the subsequent pilot signal are associated with a future slot;

means for weighting one or both of the subsequent P-CCPCH data and the subsequent pilot signal based on one or both of the estimated P-CCPCH data reliability value and the estimated pilot signal reliability value to obtain one or both of a weighted P-CCPCH data estimate and a weighted pilot signal estimate; and wherein the means for performing channel estimation further comprises means for combining the weighted P-CCPCH data estimate and the weighted pilot signal estimate.

21. The apparatus of claim 20, wherein the means for determining the subsequent P-CCPCH data reliability value comprises:

means for demodulating received P-CCPCH data;

means for comparing the received P-CCPCH data to the subsequent P-CCPCH data; and means for determining the estimated P-CCPCH data reliability value based on the comparing.

22. The apparatus of claim 21, further comprising means for determining, based on the comparing, that the received P-CCPCH data differs from the subsequent P-CCPCH data.

* * * * *